April 16, 1957 E. C. PROCTER 2,788,623
SHARPENING ATTACHMENT
Filed Dec. 14, 1955 3 Sheets-Sheet 1

INVENTOR
EDWARD C. PROCTER

ATTORNEY

April 16, 1957 E. C. PROCTER 2,788,623
SHARPENING ATTACHMENT
Filed Dec. 14, 1955 3 Sheets-Sheet 2

INVENTOR
EDWARD C. PROCTER
ATTORNEY

April 16, 1957   E. C. PROCTER   2,788,623
SHARPENING ATTACHMENT
Filed Dec. 14, 1955   3 Sheets-Sheet 3
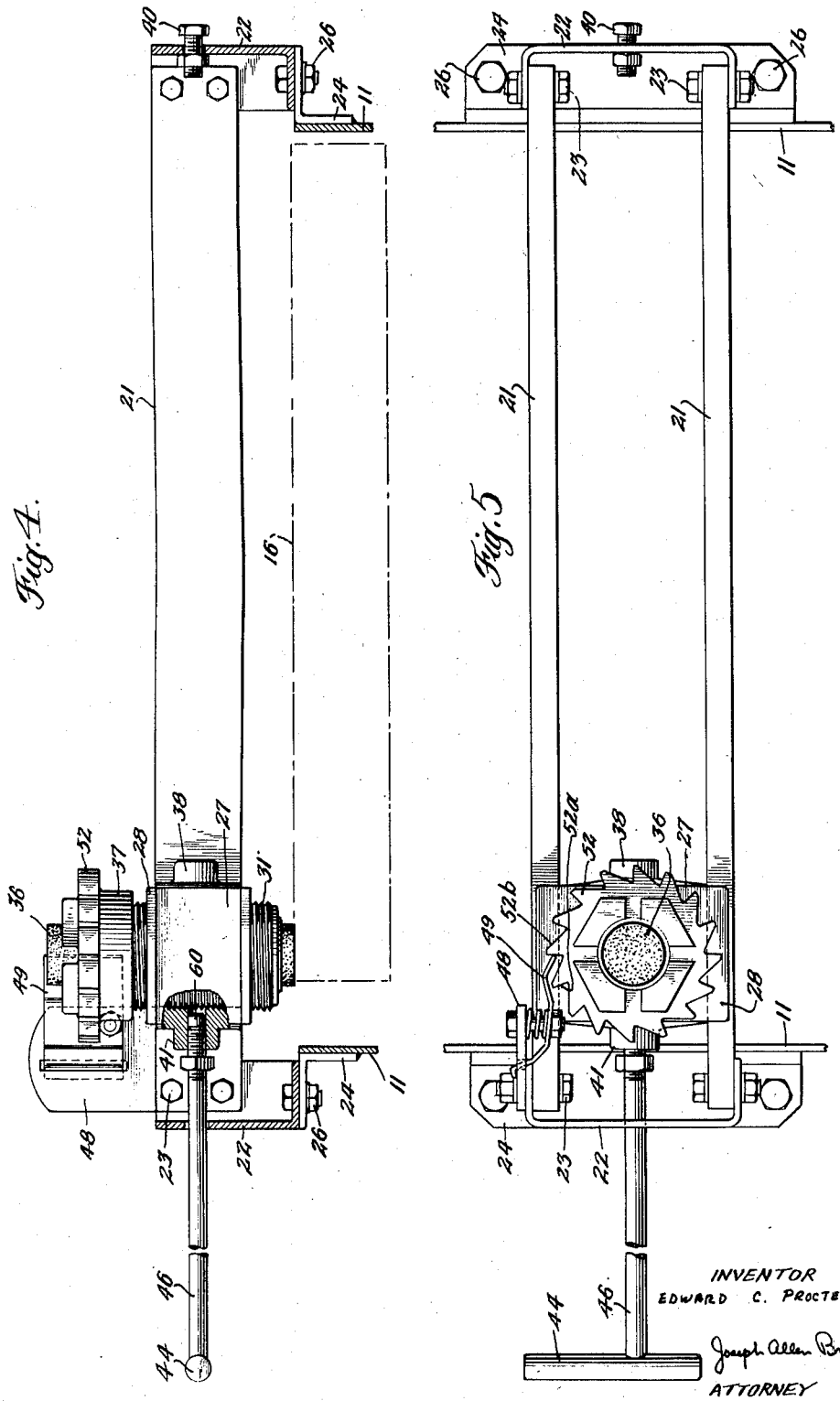
INVENTOR
EDWARD C. PROCTER
Joseph Allen Brown
ATTORNEY

United States Patent Office 2,788,623
Patented Apr. 16, 1957

2,788,623

SHARPENING ATTACHMENT

Edward C. Procter, New Holland, Pa., assignor to Sperry Rand Corporation, New Holland, Pa., a corporation of Delaware Application December 14, 1955, Serial No. 553,013

5 Claims. (Cl. 51—246)

The present invention relates generally to sharpening attachments for rotary cutter heads of the reel or cylinder type such as are customarily employed in ensilage cutters, lawn mowers, and the like. More particularly, the invention relates to an improvement in the sharpening attachment shown and described in West et al., U. S. Patent No. 2,735,248 issued February 21, 1956 and assigned to the assignee of this application.

The sharpening attachment disclosed in the above mentioned patent is guided for manual reciprocation back and forth over a cutter head with its sharpening element contiguous to surface generated by rapidly rotating knives on the cutter head. The sharpening element is mounted in a chuck threadedly supported in a carrier slideable on suitable guide tracks. Ratchet means is provided for step-rotating the chuck in its carrier at the end of each return stroke of the attachment to step-feed the sharpening element toward the rotating knives and compensate for wear of the element incident to the sharpening function.

While this attachment provides great improvements over sharpening attachments previously available, it has been found that vibrations imparted to the chuck from the sharpening element engaging the rotating knives as the attachment is reciprocated tends to cause the chuck to shift axially in its carrier. As a result, the cutting face of the sharpening element is displaced relative to the edges of the knives being sharpened and the sharpened edges of the knives are not as straight as would be the case if the chuck remained in a fixed position during reciprocation of the attachment.

One object of this invention is to provide, in a sharpening attachment of the character described, means for firmly locking the chuck in its carrier during forward and return strokes of the carrier over a cutter head and for unlocking the chuck when the carrier is in a retracted position to permit rotation of the chuck in the carrier to adjust the position of the sharpening element carried in the chuck relative to the cutting edges of the knives being sharpened.

Another object of this invention is to provide means, in a sharpening attachment of the character described, for locking the chuck in its carrier so that the sharpening element carried in the chuck can be removed therefrom or adjusted therein without the application of a holding tool to the chuck.

A further object of this invention is to provide chuck locking means in a sharpening attachment of the character described controllable through the manually operable means for reciprocating the attachment.

A still further object of this invention is to provide locking means of the character described which is of simple, inexpensive construction.

Other objects of this invention will be apparent hereinafter from the specification and from the recital in the appended claims.

In the drawings:

Figure 4 is a part side elevation, part section of the attachment in retracted position; and, Figure 5 is a plan view of Figure 4.

Figure 1:
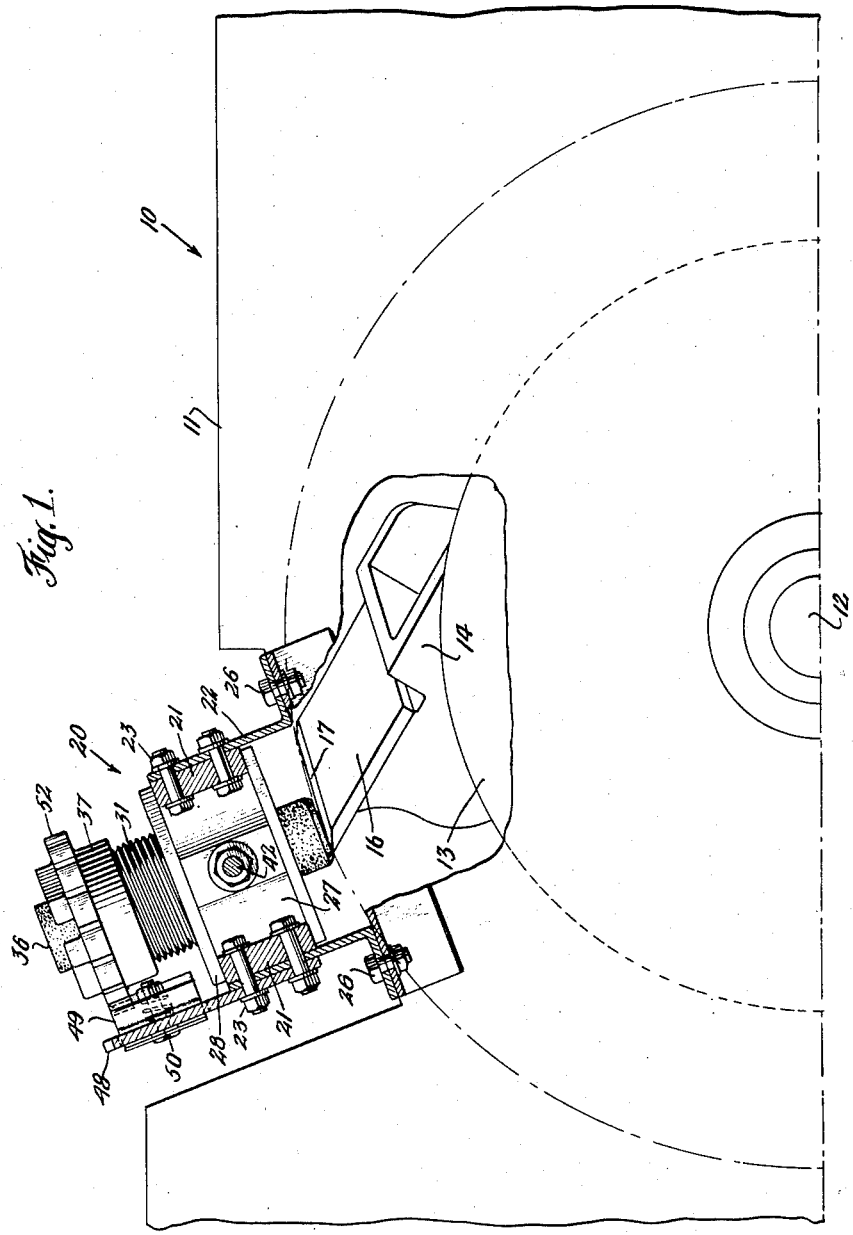
Figure 1 is a section taken on the line 1—1 of Figure 2 looking in the direction of the arrows and showing a sharpening attachment constructed according to one embodiment of this invention, the attachment being operatively mounted on an ensilage cutter, the cutter head of which is illustrated diagrammatically and fragmentarily.

Referring now to the drawing by numerals of reference, 10 denotes generally an ensilage cutter having a usual cutter and blower housing, two opposite side walls of which 11—11 are shown. Suitably journaled in walls 11 is a shaft 12 which rotatably supports a cutter head or reel having axially spaced end discs 13 (Figure 1). Carried between discs 13 are a plurality of supports 14 each of which carries a knife or cutter element 16 for rotation with the cutter head. In the illustration shown, the knives 16 are arranged with their cutting edges 17 straight and inclined relative to their axis of rotation to cooperate with a stationary bed knife (not shown) to cut material processed by the cutter head.

Mounted on the ensilage cutter is a sharpening attachment 20 which comprises a guide track having spaced, parallel track bars 21—21 connected at their ends to brackets 22—22 by bolts 23. Brackets 22 are secured to angle-irons 24—24 by bolts 26; and the angle-irons are rigidly affixed to side walls 11 of the cutter housing by welding or other means.

Supported between track bars 21, and adapted to be reciprocated along the guide track, is a carriage 27 having laterally projecting wings 28 which extend laterally of the carriage both above and below track bars 21 for sliding engagement therewith. Carriage 27 is adapted to be manually reciprocated back and forth over the guide track in a manner hereinafter described. Bolts 23 serve as stops or abutments for carriage 27 limiting its range of reciprocation and preventing it from running off of the track.

Carriage 27 has a threaded bore 30 extending vertically through it in which a tubular steel or cast iron chuck or tool holder is mounted for rotation about and movement on an axis transverse to the direction of reciprocation of the carriage and substantially radially to the axis of shaft 12. The chuck comprises an outer tubular sleeve 31 and an inner tubular sleeve 32. Sleeve 31 is externally threaded and threadably received in carriage 27. The lower end of sleeve 31 is provided with an inturned flange 33 on which an O-ring 34, of rubber or similar resilient material, seats. The lower end of inner sleeve 32 engages the O-ring.

Figure 2:
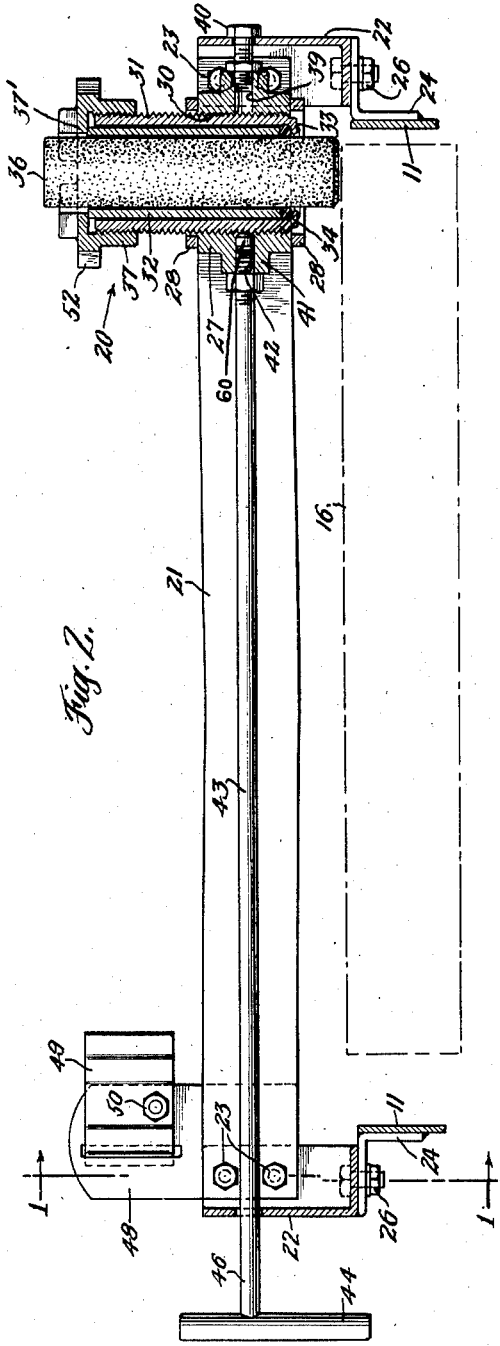
Figure 2 is a longitudinal section taken on line 2—2 of Figure 3 looking in the direction of the arrows and showing the sharpening attachment in an at-rest, extended, locked position.

Adjustably mounted in inner sleeve 32 is a cylindrical, abrasive, sharpening element 36, the working end of which extends downwardly below carriage 27. As shown in Figure 2, the upper end of inner sleeve 32 extends above the upper end of outer sleeve 31. Threaded on outer sleeve 31 is a ratchet wheel 37 having a portion 37' which engages the top of the inner sleeve. It will be apparent that by tightening ratchet wheel 37 on outer sleeve 31, inner sleeve 32 will be forced downwardly distorting and compressing O-ring 34 between its lower end and flange 33 on sleeve 31 thereby expanding the O-ring into a tight, intimate embrace with the periphery of sharpening element 36 thereby fixedly holding the sharpening element against axial movement in the chuck. O-ring 34, in addition to fixedly holding the sharpening element, serves the further purpose of cushioning element 36 to minimize the vibrations imparted to the chuck when the sharpening attachment is used.

When the sharpening element becomes worn down, the length of the portion extending downwardly below the carriage may be manually adjusted by unscrewing ratchet wheel 37 an amount sufficient to relieve the force on O-ring 34, sliding element 36 downwardly in sleeve 32, and then tightening the ratchet wheel on the chuck.

Figure 3:
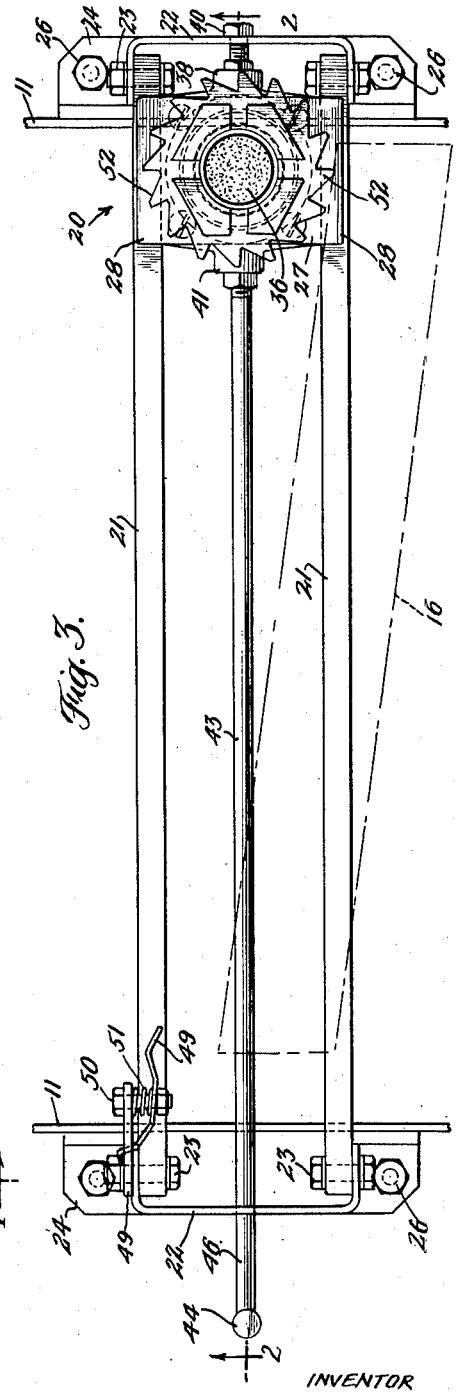
Figure 3 is a plan view of Figure 2.

In order to lock carriage 27 from movement when the sharpening attachment is not being used, as shown in Figures 2 and 3, the carriage is provided with a lateral protrusion 38 (Figure 3), having a threaded bore 39. Bore 39 is adapted to receive the threaded end of a suitable lock-bolt 40 which extends through a hole in one of the brackets 22. The sharpening element 36 is adjusted in the chuck to an up position (Figure 2) when the attachment is not being used.

Diametrically opposite protrusion 38 is a similar protrusion 41 having a threaded bore 42 communicating with bore 30 in carriage 27. Bore 42 is co-axial with bore 39 and is adapted to receive the threaded end of a rod 43 which extends between track bars 21 and through an opening in the bracket 22 at the opposite side of the sharpening attachment. Rod 43 is provided with a handle 44 at its outer end 46. By grasping handle 44, rod 43 and carriage 27 connected to it can be manually reciprocated to move carriage 27 back and forth over tracks 21, to and from the positions shown in Figures 2–3 and Figures 4–5, respectively, after, of course, unlocking the carriage by loosening lock-bolt 40.

Fastened to the bracket 22 adjacent handle 44 by bolts 23 is an upright member 48 which resiliently supports a pawl 49. The pawl 49 is connected to member 48 by a bolt 50; and, interposed between the pawl and member 48 is a spring 51.

Pawl 49 is mounted so as to engage the radial faces 52a (Figure 5) on the teeth 52 around ratchet wheel 37 when carriage 27 is moved to the far left (Figures 4–5). The arrangement may be such that each time pawl 49 engages the teeth 52, wheel 37, and the chuck connected to it, are rotated for a circumferential distance of two ratchet teeth, the chuck being rotated to feed the sharpening element 36 dowardly relative to carriage 27.

Due to the resilient mounting of pawl 49, when carriage 27 is moved forwardly, or to the right from the position shown in Figures 4–5, the pawl will be moved laterally, by a cam action exerted by cam faces 52b on teeth 52, toward member 48. The engagement of pawl 49 with cam faces 52b tend to retrogressively rotate ratchet wheel 37. To prevent this, the inner end of rod 43 is provided with an element 60 slideable axially in bore 42 of carriage 27 toward and away from the threaded periphery of outer sleeve 31 of the tool carrying chuck. Element 60 may be made of brass, nylon, or some other material adaptable for engaging the threads on sleeve 31 without damaging them due to the relative softness of element 60 compared to the harder steel or cast iron threads of the chuck. Axial movement of element 60 into and out of engagement with outer sleeve 31 is controlled by manual rotation of rod 43 by handle 44. The several functions which the brass element performs will be readily understood from the operation of the sharpening attachment.

When it is desired to sharpen knives 16, sharpening element 36 is adjusted downwardly from the position shown in Figure 2 to bring the working end of element 36 into engagement with the cutting faces 17 of the knives 16. The sharpening element 36 is then tightened in the chuck by screwing ratchet wheel 37 downwardly to thereby fix element 36 securely in relation to the chuck. Lock bolt 40 is then unthreaded to release carriage 27.

At the start of the sharpening operation, element 60 is placed in tight engagement with outer chuck sleeve 31, thereby locking the chuck in carriage 27. The operator grasps handle 44 and pulls handle 44 to the left to slide carriage 27 toward pawl 49. The blades 16, rotating at high speed, engage sharpening element 36 as carriage 27 moves along the track. Just before pawl 49 engages the teeth 52 on ratchet wheel 37, the operator loosens handle 44 a quarter turn. This causes the threaded end of the rod in bore 42 of carriage 27 to unthread slightly, thereby retracting element 60 from its tight engagement with outer sleeve 31. Carriage 27 is then pulled to the far left (Figure 4) and pawl 49 engages teeth 52 on ratchet wheel 37 and rotates the wheel a circumferential distance equal to two ratchet teeth. As wheel 37 rotates, the chuck rotates with it and is fed downwardly in carriage 27. Sharpening element 36 fixed in the chuck is thus fed downwardly to compensate for the wear sustained on the sharpening strokes across the blades. After ratchet wheel 37 has been rotated, but before the institution of the next sharpening stroke, the operator turns handle 44 back a quarter turn to again lock element 60 against chuck sleeve 31. With the chuck now in locked position, rod 43 is pushed to slide carriage 27 toward the right. The pawl 37 engaging the cam faces 52b on ratchet wheel teeth 52 is unable to retrogressively rotate the ratchet wheel since the tool holding chuck is locked by element 60. When carriage 27 reaches the far right end of the guide track it is pulled to the left again. Just before teeth 52 engage pawl 49 handle 44 is turned again to unlock the chuck. When unlocked, rod 43 is pulled to bring ratchet wheel 37 into engagement with the pawl 49 to again index the sharpening element downwardly. The chuck is relocked and the reciprocation is repeated, over and over, until blades 16 have been sharpened to a desired degree.

From the above, it will be seen that the tool holding chuck is held locked during its strokes over the cutting knives. Thus, vibrations imparted to the chuck through the sharpening element engaging the cutter knives do not produce a slipping of the chuck in its carriage. Moreover, simply by unlocking the chuck before the ratchet wheel 37 engages pawl 49, indexing of the sharpening element downwardly to compensate for wear is allowed; and after the indexing, the chuck is again locked thereby preventing retrogressive rotation of the ratchet wheel and chuck as carriage 27 moves away from pawl 49 on another forward stroke. Any necessity for providing a separate detent for ratchet wheel 37 is thereby eliminated.

Once the operator of the sharpening attachment gets the rhythm of handling rod 43, he is able to reciprocate the sharpener in a more or less continuous manner, the unlocking and the locking of the chuck each time carriage 27 is retracted taking only a few seconds.

In Figure 4, element 60 is shown considerably retracted from chuck sleeve 31. Actually, only a few thousandths of an inch of movement is involved in locking and unlocking the chuck, capable of being produced, as previously stated, merely by a quarter turn of handle 44 in one direction and an equal turn in the opposite direction.

In addition to locking the chuck in its reciprocating strokes, element 60 is employed to lock the chuck in carriage 27 when the attachment is not being used. Thus vibrations imparted to the attachment when the cutter is in use have no effect on the chuck and do not cause it to slip axially in its carriage. Moreover, it was difficult heretofore to loosen ratchet wheel 37 so that the sharpening element 36 could be replaced or adjusted. A wrench had to be applied to chuck sleeve 31, between carriage 27 and the ratchet wheel, to hold the chuck while the ratchet wheel was loosened. The necessity for using such as wrench is now eliminated, since the chuck is held by element 60.

Applicant, by his invention, has provided simple means for locking the chuck in its carriage during reciprocating strokes over the cutter head to prevent slippage of the chuck due to vibrations imparted to the chuck through the sharpening element engaging the cutter blades. Further, the locking means is quickly operable to unlock the chuck when the attachment is in retracted position to enable the feeding of the sharpening element 36 in uniform, small increments toward blades 16 to compensate for wear incident to the sharpening function. The problem of chuck slippage due to vibrations when the attachment is not in use has also been eliminated. The use of a tool to hold the chuck while the sharpening element is adjusted in the chuck is rendered unnecessary. Further, since the locking and unlocking means is controllable through the rod used for reciprocating the sharpening attachment, the objects of the invention are accomplished without materially affecting the operation of the attachment.

While the invention has been described in connection with a particular embodiment thereof, it will be understood that it is capable of further modification and this application is intended to cover any variations, uses or adaptations of the invention following, in general, the principles of the invention and including such departures from the present disclosure as come within known or customary practice in the art to which the invention pertains and as fall within the scope of the invention or the limits of the appended claims.

Having thus described my invention, what I claim is:

1. A sharpening device comprising a guide track, a carriage mounted for reciprocable movement over said guide track, means for reciprocating said carriage, a tool holder threadably supported by said carriage for adjustment transversely to the direction of movement of said carriage, means carried on said track engageable with said tool holder to impart a partial rotary movement thereto, and means controllable by said first named means for locking and unlocking said tool holder in said carriage.

2. A sharpening device comprising a guide track, a carriage mounted for reciprocable movement over said guide track, a tool holder threadably supported by said carriage for adjustment transversely to the direction of movement of said carriage, a ratchet wheel fixedly mounted on said tool holder, a pawl fixedly mounted at one end of said track and engageable with said ratchet wheel to impart a partial rotary movement thereto, and means operable to lock said tool holder in said carriage as the carriage moves over said track toward said pawl, to unlock said tool holder just prior to engagement of said ratchet wheel with said pawl and to relock said tool holder after said ratchet wheel has been rotated by said pawl.

3. A sharpening device comprising a guide track, a carriage mounted for reciprocable movement over said track, manually operable means for reciprocating said carriage, a tool holder threadably supported by said carriage for adjustment transversely to the direction of movement of said carriage, a ratchet wheel fixedly mounted on said tool holder, a pawl fixedly mounted at one end of said track and engageable with said ratchet wheel to impart a partial rotary movement thereto, and means controllable by said first named means for locking said tool holder in said carriage as the carriage moves over said track toward said pawl, for unlocking said tool holder just prior to engagement of said ratchet wheel with said pawl and to relock said tool holder after said ratchet wheel has been rotated by said pawl.

4. A sharpening device comprising a guide track, a carriage mounted for reciprocable movement over said track, said carriage having a first threaded bore extending through it, the axis of said first bore being transverse to the direction of movement of said carriage, a chuck threadably mounted in said first bore, an abrasive sharpening tool fixedly carried in said chuck, a ratchet wheel fixedly mounted on said chuck, a pawl fixedly mounted at one end of said track and engageable with said ratchet wheel to impart a partial rotary movement thereto, said carriage having a second threaded bore extending transversely to said first threaded bore and communicating therewith, and a threaded rod, said rod being threaded into said second bore to connect said rod to said carriage so that on manual reciprocation of said rod said carriage is reciprocated over said track, said rod being engageable with said chuck in said first bore whereby on rotation of said rod in one direction said rod is threaded inwardly to lock said chuck in said carriage and on rotation of said rod in a reverse direction said chuck is unlocked.

5. A sharpening device comprising a guide track, a carriage mounted for slideable, reciprocable movement over said track, said carriage having a first threaded bore extending through it, the axis of said first bore being transverse to the direction of movement of said carriage, a peripherally threaded chuck threadably mounted in said first bore, an abrasive sharpening tool fixedly carried in said chuck, a ratchet wheel fixedly mounted on said chuck, a pawl fixedly mounted at one end of said track and engageable with said ratchet wheel to impart a partial rotary motion thereto, said carriage having a pair of threaded bores positioned, respectively, on diametrically opposite sides of the carriage with their axes extending transverse to said first bore and parallel to said guide track, one of said pair of bores, at least, communicating with said first bore, a bracket connected to the end of said track opposite said one end, a lock-bolt extending through an opening in said bracket and threadable into the other of said pair of bores when said carriage is positioned at said opposite end of said track to lock said carriage against movement over said track, a rod threaded into said one bore to connect said rod to said carriage so that upon removal of said lock-bolt and reciprocation of said rod said carriage is reciprocated, the end of said rod within said one bore having an element affixed to it softer than the material from which the chuck is made, said element being engageable with the periphery of said chuck in said first bore on rotation of said rod in one direction and disengageable with said chuck on rotation of said rod in a reverse direction.

References Cited in the file of this patent

UNITED STATES PATENTS

| 2,113,186 | Vuilleumier | Apr. 5, 1938 |
| 2,735,248 | West et al. | Feb. 21, 1956 |